Feb. 20, 1951  J. A. CALDWELL  2,542,475
PRINT WHEEL MECHANISM
Original Filed June 20, 1942  2 Sheets-Sheet 2
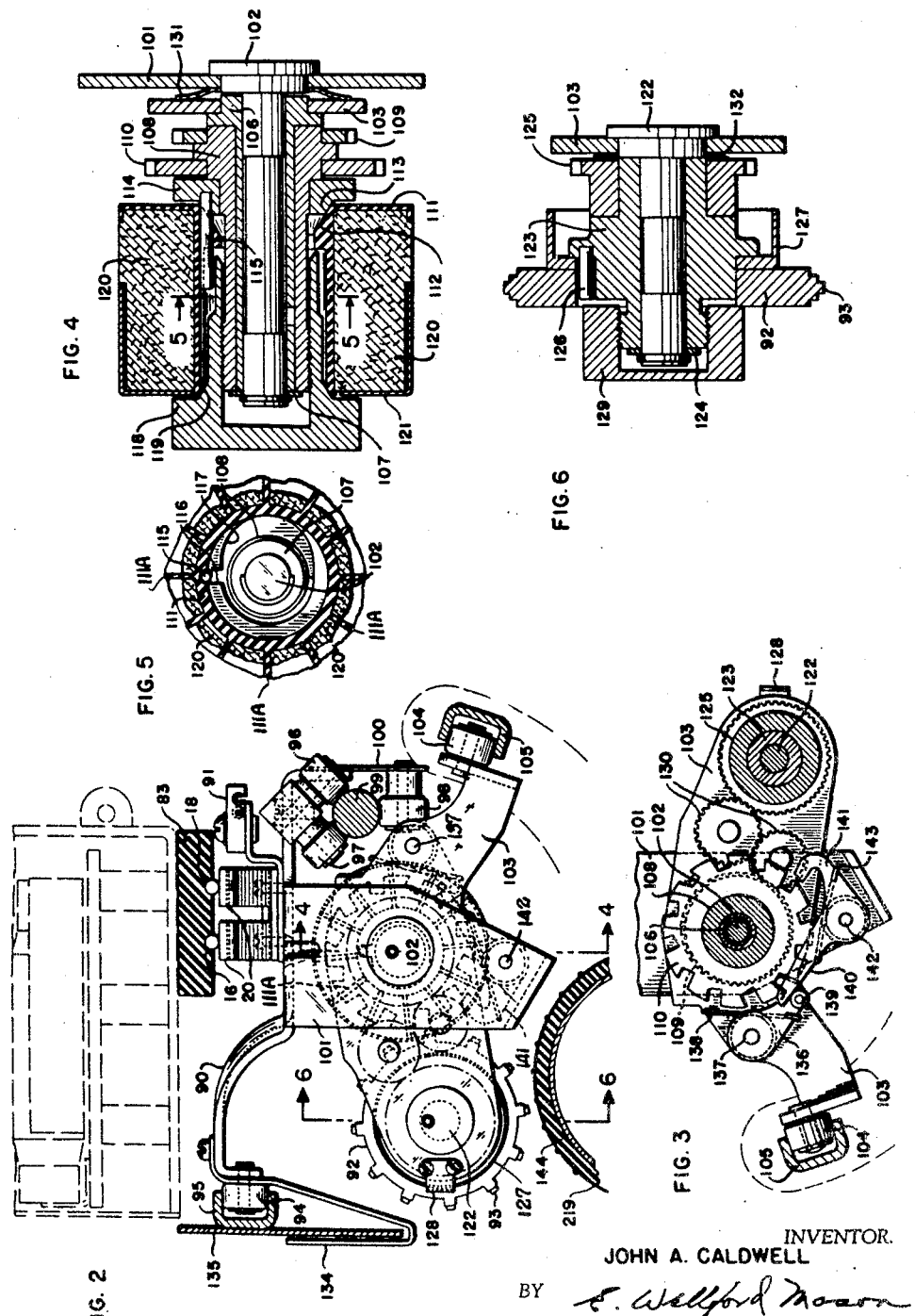
INVENTOR.
JOHN A. CALDWELL
BY E. Wellford Moson
ATTORNEY Patented Feb. 20, 1951

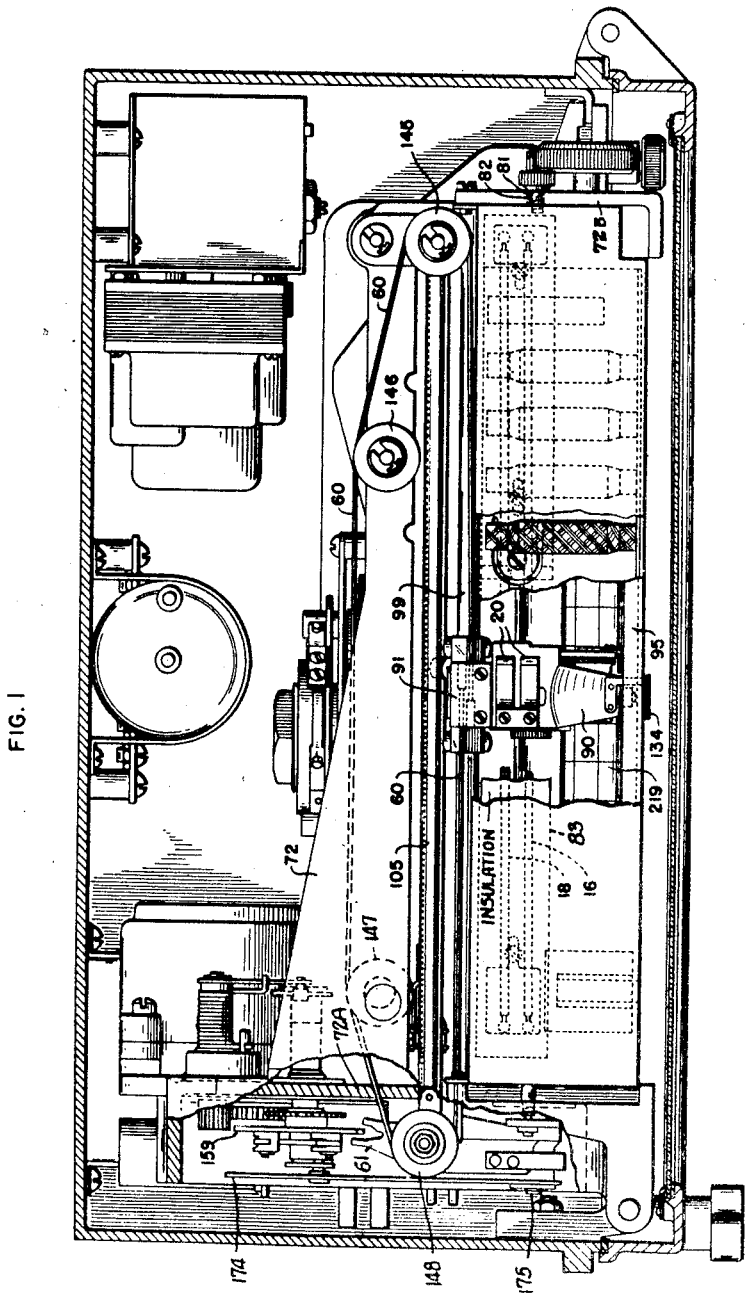

2,542,475

UNITED STATES PATENT OFFICE 2,542,475

PRINT-WHEEL MECHANISM

John A. Caldwell, Philadelphia, Pa., assignor, by mesne assignments, to Minneapolis-Honeywell Regulator Company, Minneapolis, Minn., a corporation of Delaware Original application June 20, 1942, Serial No. 447,863. Divided and this application October 24, 1946, Serial No. 705,301

6 Claims. (Cl. 346—106)

The present application is a division of my copending application Serial Number 447,863, filed on June 20, 1942, now Patent 2,423,480, issued July 8, 1947. That application is directed generally to the features of a self-balancing potentiometer of the strip chart type, while the present application is specifically directed to the print wheel carriage and the mechanism by means of which the print wheel and the ink wheel are rotated.

In most multiple recording instruments there is provided a print wheel carriage on which is formed a plurality of printing characters. Each of these characters must be moved to a recording position corresponding to the value of the condition under measurement when a particular primary element, for example a thermocouple, is connected to the instrument. Thereafter the print wheel is moved to bring the character then in recording position into engagement with a chart to make a record. There is also provided an ink wheel having one or more ink pads that are brought into engagement with the printing characters prior to the time each record is made. If all the records are to be in the same color a single ink pad may be used. It is more usual, however, to have each record made in a different color so that a different ink pad must be provided for each printing character. This means that the movement of the ink wheel must be synchronized with the movement of the print wheel so that the same printing character will always engage the same color ink pad.

It is an object of the present invention to provide an instrument which is adapted to make in sequence the record of the values of a plurality of variables. It is a further and more specific object of the invention to provide a print wheel carriage that is so constructed that the print wheel and ink wheel may be synchronously rotated in such a manner that they will not get out of step.

It is a further object of the invention to provide a novel and accurate construction of a print wheel carriage by means of which the print wheel and ink wheel may be rotated as the print wheel is moved away from and toward the chart. In this fashion immediately after a record has been made the print wheel is rotated to bring a new printing character into recording position in readiness for the next record to be made.

It is a further object of the invention to provide a novel arrangement for positively and accurately rotating the ink wheel and print wheel on a print carriage of a multiple recording instrument which arrangement is entirely mounted on the carriage.

It is a further object of the invention to provide a novel means for holding the ink wheel in position on a print wheel carriage. This means is so arranged that the ink wheel can be mounted in only one position, and is further characterized by the fact that the ink wheel may be moved into place on the print wheel carriage without engaging the printing characters of the print wheel.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Figure 1 is a top view, partly in section, of the potentiometer instrument,

Figure 2 is a side view looking from the right in Figure 1 of the print wheel carriage, Figure 3 is a sectional view of a portion of the print wheel carriage, Figure 4 is a view taken on line 4—4 of Figure 2, Figure 5 is a line taken on line 5—5 of Figure 4, and Figure 6 is a view taken on line 6—6 of Figure 2.

The above mentioned Patent 2,423,480 has in it a complete disclosure of the potentiometer mechanism as a whole. Reference is made to that application for a description of various details of the instrument which are not pertinent to the subject matter of the present case.

As is well known, potentiometer mechanisms are used to measure accurately various conditions such as temperature. For this purpose thermocouples are subjected to the temperature to be measured and the E. M. F. produced by these thermocouples is impressed in sequence upon the potentiometer network of the instrument. A print wheel carriage is then moved to a position above a recording chart corresponding to the temperature to which the thermocouple then connected with the instrument is subjected. A record is then made of this temperature and a different thermocouple is connected to the instrument and the print wheel carriage is moved to a position corresponding to this temperature. The mechanism by which this is done is described in detail in the above mentioned parent patent and for purposes of this disclosure it is necessary to refer only briefly to various parts of the mechanism shown in Figure 1 to describe how this operation is performed.

In response to potentiometer unbalance a reversible motor is operated in one direction or the other to shift a cable 60, which is mechanically attached to the motor, in one direction or the other. This cable, as shown in Figure 1 of the drawings, passes around a series of pulleys 145 to 148 inclusive on a frame 72 and is attached at its ends to a print wheel carriage 90 at a point 91. As the motor is energized this cable pulls the print wheel carriage in one direction or the other to a position above the recording chart 219. When the potentiometer circuit is balanced the driving motor will be deenergized and the print wheel carriage will be in the proper position. Deenergization and therefore non-movement of the print wheel carriage is detected by a detecting mechanism including a part 61 which is engaged by a cam 159. Upon stoppage of the print wheel carriage this detecting mechanism acts through suitable driving means to move a lever 174 which is pivoted at 175, first upwardly then downwardly and then upwardly again to accomplish the printing and indexing operations. The specific manner in which this is done is immaterial as far as the subject matter of this case is concerned since the present case is directed specifically to the construction of the print wheel mechanism. It is sufficient to say that a channel member 105 shown in Figures 1, 2 and 3 is attached to lever 174 and is therefore first moved upwardly in Figure 2 a sufficient distance to bring the print wheel into engagement with the chart. This channel member is then moved downwardly to a predetermined point and then returned to the position shown in Figure 2 of the drawing. While the downwardly and return movements are taking place the ink and print wheel are rotated to bring a new printing character into recording position above the chart.

It is noted that the print wheel carriage 90 carries upon its upper surface a pair of contacts 20 which engage respectively a slidewire 16 and a collector bar 18. These parts are mounted upon an insulating support 83 that extends lengthwise of the instrument and which is held in position thereon. The position of the contacts 20 along the slidewire determines the balance point of the potentiometer mechanism and therefore the position of the print wheel carriage. Therefore, as the motor rotates, the print wheel carriage will be moved back and forth across the instrument and carry the contact 20 with it across the slidewire to a position of balance. This print wheel carriage has on it a print wheel 92 that is provided with printing characters or numerals 93 which are to be moved into engagement with the chart when the print wheel carriage reaches a balanced position. It is noted that chart 219 is moved under the print wheel at a constant speed by a chart drum 144. The manner in which the print wheel carriage operates will now be described.

Refer now to Figures 2 to 6 which show the print wheel carriage in detail. The print wheel carriage 90 is supported at its front end by a roller 94 that is received in a channel member 95 which runs the length of the instrument and is attached at its ends to the frame members 72A and 72B of frame 72. The rear end of the print wheel carriage is supported by means of rollers 96, 97, and 98 which bear against and roll on a shaft 99 which is also attached at its ends to the frame parts 72A and 72B. The rollers 96 and 97 are rigidly mounted on the print wheel carriage, and the roller 98 is supported on a spring 100 which is attached to the print wheel carriage. In this manner, the roller 98 is forced into engagement with the rod 99 to prevent any upward movement between the print wheel carriage and the shaft, and to keep the print wheel carriage rigidly mounted in position as it moves back and forth above the chart 219, upon which the recording of the temperature is to be made. The print wheel carriage 90 has formed on one side thereof, a downwardly extending plate 101 which has a stud shaft 102 rigidly mounted therein. Pivoted on this shaft is a supporting plate member 103 that has a roller 104 journaled on its rear end. This roller rides in a channel member 105 that is moved in a manner described above, for the purpose of producing the printing operation, and for the purpose of actuating a switch to connect the instrument to different thermocouples.

As more particularly shown in Figure 4, the shaft 102 has a sleeve 106 rotatably mounted on it. This sleeve, along with a second sleeve 108, that is rotatable on the first, are both held in position on the shaft 102 by means of a suitable lock washer 107. The plate 103 is staked to the sleeve 106 so that the plate and sleeve can oscillate around the shaft. The sleeve 108 has a gear 109 and a ratchet wheel 110 staked to it. The ratchet wheel serves the purpose of rotating the ink pad assembly which is mounted on the former sleeves. The ink pad assembly is made of tubular moulding 111 that may be of plastic or metal and which is formed with a series of radially extending fins 111A that serve to divide this moulding into a series of compartments. The axial bore of the moulding has a circular flange with a sloping face or surface 112, formed on its right-hand side, which engages with a cooperating surface 113 on a flange member 114 that is suitably fastened to the sleeve 108. This member is provided with a pin 115 that cooperates with a groove 116 formed in a central opening 117 in the flange of the moulding 111. The central opening 117 in the flange is eccentric in shape as shown best in Figure 5. The ink pad assembly is held on sleeve 108 by means of a knob 118 that has a cam face 119 engaging the left end of the moulding and which serves to properly center the assembly. Located within the radially extending compartments of the moulding 111 are felt pads 120, each of which may be impregnated with a different color ink if desired, so that each of the records made of the different thermocouple temperatures will be recorded in a distinctive color. The felt pads are held in place in the moulding by means of a shield 121 as best shown in Figure 4.

The ink pad assembly is mounted on the print wheel carriage by moving the moulding 111 containing the pads on the sleeve 106 from the left in Figure 4. Since the printing characters 93 normally engage the ink pads 120 some means must be provided for keeping these parts separated while the ink pads are being moved into place. This is the reason why the central opening 117 is made eccentric in shape. As a first step in assembling the moulding 111 bearing the ink pads 120 upon the print wheel carriage 90, the channel member 105 is operated so as to rotate the print wheel 92 as well as the sleeve 106 (on which the ink pad assembly is mounted) until a selected printing character or numeral 93 is aligned with the pointer 128. When the parts are in such an alignment, the pin 115 on the flange member 114 is at its furthest point of travel away from the print wheel 92 or about 90° in a clock-wise direction from the position in which it is shown in Fig. 2. With the pin 115 as far as possible away from print wheel 92, the ink pad assembly can be rotated about pin 115 as a pivot to separate the ink pads 120 from the printing characters 93. In mounting the moulding on the sleeve 106, the moulding is first rotated in the air about its own central axis until its groove 116 is lined up with pin 115, and moved toward the right in Figure 4. The moulding is then moved clockwise from the axial position in Figure 5 around pin 115 as a center (counter-clockwise in Figure 2) to separate the felts 120 and the printing characters 93. Thereafter the moulding is again moved to the right in Figure 4 until its surface 112 engages surface 113. Knob 118 is then screwed into place; engagement between its surface 119 forcing surfaces 112 and 113 into engagement with each other. Thus the moulding is rotated back into an axial position and centered by the concentric surfaces 113 and 119 with the ink pads in engagement with the printing characters on the print wheel.

Also mounted on the plate 103 is a stud shaft 122. This shaft has rotating upon it, a sleeve 123 that is held in place by means of a washer 124. Staked to the sleeve is a drive gear 125. Also mounted on the sleeve 123 is the print wheel 92 that is held in proper position relative to the sleeve by means of engagement between a slot in the print wheel, and a pin 126 extending from the sleeve. Before the print wheel is placed on the sleeve, an indicating drum 127 is moved into place as shown best in Figure 6. This drum has a series of numbers on it which correspond to the print characters 93 on the print wheel, and are so displaced with respect to these characters, that when a printing character is in engagement with the chart, the corresponding numeral on this drum will be in a position where it can be seen from the front of the instrument as shown best in Figure 2. A pointer 128 is attached to the plate 103, and cooperates with the drum 127 to indicate the proper number. The print wheel and the indicating drum are held in place on the sleeve 123 by means of a knob 129 that is screwed on the outer end of the sleeve. As best shown in Figure 3, the gear 109 serves to drive the gear 125 by means of idler pinions 130, both of which are mounted for rotation on the plate 103.

Since it is imperative that the print wheel can be exactly located with respect to the print wheel carriage a spring 131 is placed between the plate 101 of the print wheel carriage and the oscillating plate 103. This spring serves to take up any slack in the parts, and always keeps the plate 103 properly placed, with respect to the plate 101. For a similar reason, a spring 132 is inserted between the plate 103 and the gear 125 in order that the print wheel will be properly located on its shaft 122.

The print wheel carriage 90 is also provided on its front end, with an indicating pointer 134 that coperates with a scale 135, which is attached to the channel member 95 and extends across the front of the instrument. This indicator serves the purpose of showing the value of the temperature being measured as it moved in front of the scale 135.

The print wheel and the ink pads are normally kept from rotating on their shafts by means of a pawl 136 that is pivoted at 137 on the oscillating plate 103, and which is biased into engagement with teeth on the ratchet wheel 110 by means of a spring 138. A roller 139 which extends from the pawl 136 engages a surface of arm 140 on a second pawl 141 that is pivoted at 142 on the carriage plate 101. This pawl is normally biased in a counter-clockwise direction in Figure 3, by means of a spring 143 that is equal in strength to the spring 138. This latter pawl is used to rotate the print wheel to bring a new printing character into printing position above the chart each time a new thermocouple is connected to the instrument. The operation takes place due to an oscillation of plate 103 which is imparted thereto by means of the channel member 105. This channel member is moved in an arc concentric with the stud shaft 102, by means of a mechanism mentioned above, after the instrument has reached a balanced position.

In the operation of the print wheel, as the channel 105 is moved upwardly, the member 103 will be moved in a counter-clockwise direction in Figure 2 or a clockwise direction in Figure 3 to bring a printing character 93 into engagement with chart 219 that is placed over chart driving drum 144.

After a printing character has been brought into engagement with the chart, channel 105 will be moved downwardly. This means that the member 103 will be moved counter-clockwise in Figure 3 with the pawl 136 in engagement with ratchet 110 thus preventing any relative rotation of the parts mounted on member 103. As this movement continues the roller 139 on pawl 136 will move to the right along the surface of arm 140 until such time as the lever arm between roller 139 and the pivot 142 for pawl 141 has been shortened enough for the force of spring 143 to overcome that of spring 138. At that time the pawl 141 will move into engagement with the ratchet 110 and, acting through the arm 140, will move pawl 136 out of engagement with the ratchet. This will occur at the bottom of the stroke of lever 174, and with the printing wheel in its highest position above the chart drum. Lever 174 will then be moved to move channel 105 upwardly, which means that member 103 will move clockwise in Figure 3. During this movement the pawl 141 is in engagement with the ratchet 110 and will thereby prevent that ratchet and the gear 109 from rotating relative to the part 101. While the member 103 is moved clockwise, however, idlers 130 and gear 125 upon which the print wheel is mounted will rotate, thereby moving the print wheel clockwise in Figure 3 and counter-clockwise in Figure 2 to bring a new printing character into printing position above the chart drum. This indexing or movement of the printing character, which is next to be printed, into printing position takes place at that stage in the cycles of operations during which the pawl 141 locks the ink pad assembly against rotation relative to the print wheel carriage and immediately preceding the downward movement of the print wheel which carries the selected printing character into engagement with the chart 219. As this clockwise movement of the part 103 continues the roller 139 will move away from the pivot point 142 and the lever arm between 139 and 142 will become large enough for spring 138 to overcome the force of spring 143. At this time the pawl 136 will move into engagement with the ratchet 110 and maintain the parts in the position shown until the next printing operation occurs. It will be seen, therefore, that the ratchet 110 is positively locked for movement with the part 103 by pawl 136 or is positively locked against movement by the pawl 141. At no time is the ratchet wheel, and therefore the print wheel, free to rotate because the pawls are so designed that pawl 141 is moved into engagement with a tooth of the ratchet as pawl 136 is moving out of engagement therewith. It will, therefore, be seen that as channel 105 starts to move after the instrument has come into balance its movement will produce a printing operation and then an operation whereby a new printing character is brought into printing position above the chart.

From the above description it will be seen that I have provided a print wheel carriage mechanism which is simple and accurate. This carriage is characterized by the fact that the print wheel and the ink wheel are always moved a predetermined amount as a result of each printing operation. It will be seen that it is practically impossible for the parts to get out of step with each other.

While in accordance with the provisions of the statutes I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure by Letters Patent is as follows:

1. A multiple recording instrument comprising a print wheel carriage, a member mounted for pivotal movement on said carriage, means to move said member in opposite directions through a path, a print wheel having a plurality of printing characters rotatably mounted on said member, an ink pad wheel rotatable on said member whereby different characters on said print wheel may be brought into engagement with different portions of said ink pad wheel, a ratchet mounted to rotate with said ink pad wheel, a first pawl on said carriage biased to engage said ratchet, a second pawl on said carriage biased to engage said ratchet, cooperating means between said first and second pawls acting to keep one of said pawls out of engagement with said ratchet in each direction of movement of said member, whereby upon movement of said member in one direction said ratchet will move with said member and in movement of said member in the opposite direction said member will be rotated relative to said ratchet, and means to rotate said print wheel as said ink pad wheel rotates relative to said member.

2. In a multiple recording instrument, a print wheel carriage comprising a member pivoted thereon and adapted to be moved in opposite directions through a path, an ink pad assembly rotatably mounted on said carriage coaxial with said member, a ratchet rotatable with said assembly, a first pawl mounted on said member and biased toward engagement with said ratchet, a roller extending from said pawl, a second pawl pivoted on said carriage and biased toward engagement with said ratchet and having an extension thereon upon which said roller bears, means to move said member in such a direction that said roller will move along said extension toward the pivot point of said second pawl said movement continuing until the leverage of said extension between said pivot point and roller is short enough for the bias of said second pawl to move said second pawl into engagement with said ratchet and move said first pawl out of engagement therewith, said moving means then moving said member in the opposite direction, said second pawl operating to hold said ratchet stationary as said member moves, a print wheel rotatably mounted on said member, and gearing between said ratchet and print wheel.

3. In a multiple recording instrument, a print wheel carriage, a member mounted for oscillation on said carriage, an ink wheel assembly mounted for rotation on said carriage coaxial with said member, a print wheel having a plurality of printing characters thereon cooperating with said ink wheel and mounted for rotation on said member, gearing between said print wheel and ink wheel assembly whereby rotation of one produces rotation of the other, a ratchet wheel attached to said ink wheel assembly, pawls on said member and on said carriage biased respectively toward engagement with said ratchet wheel, cooperating means between said pawls whereby one of said pawls is at all times in engagement with said ratchet, and means to move said member relative to said carriage.

4. In a multiple recording instrument, a print wheel carriage, a print wheel having a plurality of print characters rotatably supported on said carriage, an ink wheel having mounted thereon a plurality of ink pads, one for each printing character, said ink wheel comprising a tubular body having an inwardly extending flange on one end, said flange having an opening therein a portion of which is concentric and a portion of which is eccentric to said ink wheel, means to support said ink wheel comprising a shaft having a shoulder concentric therewith to receive the opening in said flange, said opening permitting the ink wheel to be moved laterally of said shaft so that the ink pads will be out of engagement with the printing characters as the ink wheel is being mounted on said shaft, and a part received by said shaft being provided with a concentric shoulder adapted to fit into the end of said tubular body to normally center the same on said shaft.

5. In a multiple recording instrument, the combination of a print wheel carriage, a print wheel having a plurality of printing characters therein mounted for rotation on said carriage, an ink wheel assembly having a plurality of ink pads, one for each printing character, also mounted for rotation on said carriage, said assembly including a tubular body having a plurality of radial flanges extending outwardly and along the length thereof between each pair of which an ink pad is located, said body also having an inwardly extending flange through which is an opening a portion of which is concentric and a portion of which is eccentric to said member, and a notch at the edge of the opening adjoining said portions, means to mount rotatably said assembly on said carriage including a shaft extending through the opening of said tubular body and having a pin adapted to be received by said notch, said pin and notch serving as a pivot for said assembly whereby it may be moved to separate the ink pads from the print wheel as the assembly is being placed on its supporting shaft, and means to center and hold said assembly in position.

6. In a multiple recording instrument, a print wheel carriage, a member mounted for oscillation on said carriage, an ink wheel assembly mounted for rotation on said carriage coaxial with said member, a print wheel having a plurality of printing characters thereon, said print wheel being mounted on said member in a position so that the printing characters engage with the ink wheel, gearing between said print wheel and ink wheel whereby rotation of one produces rotation of the other, a ratchet wheel having an extending shaft upon which said ink wheel is mounted, pawls on said member and carriage biased toward engagement with said ratchet wheel, cooperating means between said pawls whereby one of said pawls is at all times in engagement with said ratchet, means to move said member relative to said carriage, said ink wheel having a tubular body having an inwardly extending flange on one end, said flange having an opening therein, a portion of which is concentric and a portion of which is eccentric to the tubular body and a notch at the edge of the opening adjoining said portions, a pin on said ratchet and extending parallel to said shaft and adapted to be received by said notch, said pin and notch serving as a pivot for said tubular member whereby the latter may be rotated about the pivot so that the shaft is received by said eccentric portion as said ink wheel assembly is being moved into place to separate the ink wheel from the print wheel, and means to center and hold said ink wheel assembly in place on said shaft.

JOHN A. CALDWELL.

REFERENCES CITED

The following references are of record in the file of this patent:

UNITED STATES PATENTS

| Number | Name | Date |
| --- | --- | --- |
| 2,085,325 | Miller | June 29, 1937 |
| 2,207,343 | Fairchild | July 9, 1940 |
| 2,328,664 | Moore | Sept. 7, 1943 |